(12) United States Patent
Karasawa et al.

(10) Patent No.: US 7,601,949 B2
(45) Date of Patent: Oct. 13, 2009

(54) OPTICAL SCANNER DEVICE

(75) Inventors: Satoshi Karasawa, Saitama (JP); Jun Mizuno, Tokyo (JP)

(73) Assignee: HOYA Corporation, Tokyo (JP)

( * ) Notice: Subject to any disclaimer, the term of this patent is extended or adjusted under 35 U.S.C. 154(b) by 0 days.

(21) Appl. No.: 12/340,080

(22) Filed: Dec. 19, 2008

(65) Prior Publication Data

US 2009/0101801 A1    Apr. 23, 2009

Related U.S. Application Data

(63) Continuation of application No. 11/741,210, filed on Apr. 27, 2007, now Pat. No. 7,479,626, which is a continuation-in-part of application No. PCT/JP2005/019667, filed on Oct. 26, 2005.

(30) Foreign Application Priority Data

Oct. 29, 2004  (JP)  .............................. 2004-316106

(51) Int. Cl.
*H01J 3/14* (2006.01)

(52) U.S. Cl. .................... 250/234; 250/216; 359/205.1; 347/250

(58) Field of Classification Search ......... 250/234–236, 250/216; 359/205.1, 209.1, 214.1, 216.1; 347/250, 256, 258
See application file for complete search history.

(56) References Cited

U.S. PATENT DOCUMENTS

| 4,893,008 | A | 1/1990 | Horikawa |
| 5,771,115 | A | 6/1998 | Takanashi |
| 6,091,067 | A | 7/2000 | Drobot et al. |
| 6,404,031 | B1 | 6/2002 | Hane et al. |
| 6,795,603 | B2 | 9/2004 | Utsunomiya |
| 7,479,626 | B2 * | 1/2009 | Karasawa et al. ........... 250/234 |
| 2001/0012136 | A1 | 8/2001 | Kurosawa |
| 2002/0012040 | A1 | 1/2002 | Hori |
| 2002/0097474 | A1 | 7/2002 | Morita |
| 2002/0180862 | A1 | 12/2002 | Suda |
| 2004/0165236 | A1 | 8/2004 | Morita |

FOREIGN PATENT DOCUMENTS

| JP | 60-189724 | 9/1985 |
| JP | 9-103893 | 4/1997 |
| JP | 11-312821 | 11/1999 |
| JP | 2000-98271 | 4/2000 |
| JP | 2003-29172 | 1/2003 |

OTHER PUBLICATIONS

English language Abstract of JP 60-189724, Sep. 27, 1985.
English language computer generated translation of JP 9-103893, 1997.
English language computer generated translation of JP 2000-98271, 2000.

* cited by examiner

*Primary Examiner*—Kevin Pyo
(74) *Attorney, Agent, or Firm*—Greenblum & Bernstein, PLC

(57) ABSTRACT

An optical scanner device, comprising a scanning unit, which casts irradiation light emitted from a light source in an arbitrary direction to scan an observation object, an objective lens system, which converges the irradiation light on the observation object, and a photo-detector unit, which is disposed on an optical axis of the objective lens system to have the irradiation light transmit therethrough, is provided. A position of the irradiation light converged on the observation object is detected based on a position of a light spot of the irradiation light transmitting through the photo-detector unit.

1 Claim, 6 Drawing Sheets

US 7,601,949 B2

OPTICAL SCANNER DEVICE

CROSS-REFERENCE TO RELATED APPLICATION

This application is a continuation of pending U.S. patent application Ser. No. 11/741,210 filed Apr. 27, 2009, now U.S. Pat. No. 7,479,626, which is a continuation-in-part of International Application PCT/JP2005/019667, with an international filing date of Oct. 26, 2005, the disclosures of which are expressly incorporated herein by reference in their entireties. This application claims priority of Japanese Patent Application No. 2004-316106, filed Oct. 29, 2004, the disclosure of which is expressly incorporated by reference herein.

BACKGROUND OF THE INVENTION

The present invention relates to a small-type optical scanner device having a photo-detector unit capable of accurately detecting a position of a light spot.

Conventionally, a confocal probe device having an optical scanner unit and a confocal optical system has been known. The optical scanner unit can cast irradiation light (for example, laser light) emitted from a light source onto an observation object and is adapted to scan the observation object by being driven by a drivable optical fiber and an electrostatically-actuated mirror. The confocal optical system receives the light scanned and reflected on a focal plane of the observation object and eventually generates a confocal image of the observation object based on the reflected light. Further, the confocal probe device detects a position of a light spot of the emitted light on the observation object so that a spot on the observation object on which the emitted light is to be cast is controlled based on the actually detected result. A following method has been known conventionally as a method to detect the spot to cast the emitted light.

FIG. 6 shows such a conventional optical scanner device 300 having an electrostaticaly-actuated mirror as a means for casting irradiation light onto an observation object 315. The optical scanner device 300 is provided with a mirror unit 302 and an objective lens system 305. The irradiation light 311 (laser light) is reflected on the mirror unit 302 and enters the objective lens system 305. The irradiation light 311 entering the mirror unit 302 is a parallel pencil, which is focused on the observation object 315. (In FIG. 6, a light spot 317 indicates the focal point.)

The mirror unit 302 includes a base plate, which is not shown, on a side of a mirror surface in the mirror unit 302 which is opposite to a side receiving the irradiation light 311, and drive electrodes are provided on the base plate. By applying voltage to arbitrary electrodes, electrostatic force is generated between the drive electrodes and the mirror so that a part of the mirror is attracted by the drive electrodes, and the mirror surface of the mirror unit 302 is arbitrarily angled. As the electric capacitance being stored in the drive electrodes when the voltage is applied and an inclination angle of the mirror are approximately linearly-related, the angle of the mirror surface can be defined by the electric capacitance stored in the drive electrodes. Therefore, a position coordinate of the light spot 317 on the observation object 315 can be calculated based on the electric capacitance. An example of such a typical mirror unit which can be electrostatically actuated is disclosed in Japanese Patent Provisional Publication No. 2003-29172.

In the optical scanner device 300 disclosed in the above publication, as the inclination angle of the mirror surface in the mirror unit 302 increases, the relation between the electric capacitance and the inclination angle of the mirror surface becomes nonlinear, thus the inclination angle of the mirror surface cannot be obtained accurately. As a result, a position wherein a control unit of the optical scanner device 300 recognizes the light spot 317 should be (which is referred to as a target position) and a position of the actually controlled light spot 317 are separated as the inclination angle of the mirror surface increases. Therefore, a problem occurs as such the image generated based on reflection which is not accurately controlled is distorted when the inclination angle of the mirror surface is greater.

In consideration of the above problem, in order to obtain an image without being distorted, it is required to measure the position of the light spot more stably rather than depending on the inclination angle of the mirror unit. Conventionally, a following method has been known as a method to measure the position of the light spot independently from the inclination angle of the mirror unit.

FIG. 7 shows a conventional optical scanner device 400 to measure a position of a light spot independently from the inclination angle of the mirror unit. The optical scanner device 400 is provided with an optical fiber 401, an objective lens system 405, a beam splitter 407, a photo-detector element 409 (for example, a photodiode). The optical fiber 401 includes a scanner unit 403. It should be noted that the optical fiber 401 can be driven in arbitrary directions by external force to scan the irradiation light 411 and is exchangeable with a mirror unit such as one described above as the mirror unit 302.

The scanner unit 403 is driven by a driving means which is not shown to cast irradiated light 411. The irradiated light 411 is emitted from the scanner unit 403 to the objective lens system 405. The irradiated light 411 transmitted through the objective lens system 405 injects into the beam splitter 407, whereby a part of the irradiated light 411 is split and angled at 90 degrees with respect to the direction of travel to enter the photo-detector element 409. An optical axis of the part of the irradiation light 411' split from the original irradiation light 411 is referred to as an optical axis 413'. The remaining part of the irradiated light 411 advances straight to reach an observation object 415.

With this configuration, an XYZ coordinate system and its original point O are defined on the observation object 415 as shown in FIG. 7. That is, an intersecting point of an optical axis 413 and a predetermined position of the observation object 415 is defined to be the original point O, and a direction parallel to the optical axis 413 is defined to be an direction of a Z axis. An X axis and a Y axis are perpendicular to each other and to the Z axis. Further, a corresponding coordinate system with an X' axis, a Y' axis, and a Z' axis and an original point O' is defined. That is, an intersecting point of an optical axis 413' and (an incident surface of) the photo-detector element 409 is defined to be the original point O', and a direction parallel to the optical axis 413 is defined to be a direction of the Z' axis. The X' axis and the Y' axis are perpendicular to each other and to the Z' axis.

A position coordinate (X, Y) of the light spot 417 on the observation object 415 with respect to the original point O can be obtained by detecting a position coordinate (X', Y') of the light spot 417' on the photo-detector element 409 with respect to the original point O'. Thus, a position of the light spot can be measured independently from an inclination angle of a mirror unit.

However, in the optical scanner device 400, the irradiation light 411' split by the beam splitter 407 is received in a position separated from the original optical axis 413, therefore, a size of the device itself tends to be larger to include the photo-detector element 409 and other accompanying components. Thus, in a small space such as inside a front end portion of a probe, a smaller optical scanning device capable of detecting an accurate position of the light spot has been demanded.

SUMMARY OF THE INVENTION

In consideration of the above circumstance, the present invention is advantageous in that providing an optical scanner device having a detecting unit to detect a position of light, which is small and capable of detecting a position of a light spot with higher accuracy.

According to an aspect of the present invention, there is provided an optical scanner device, having a scanning unit, which casts irradiation light emitted from a light source in an arbitrary direction to scan an observation object, an objective lens system, which converges the irradiation light on the observation object, and a photo-detector unit, which is disposed on an optical axis of the objective lens system to have the irradiation light transmit therethrough. A position of the irradiation light converged on the observation object is detected based on a position of a light spot of the irradiation light transmitting through the photo-detector unit.

Optionally, the objective lens system may include a first objective lens unit, which receives the irradiation light from the light source via the scanning unit, and a second objective lens unit, which receives the irradiation light emitted from the first objective lens unit. The photo-detector unit may be disposed between the first objective lens unit and the second objective lens unit.

Optionally, the photo-detector unit may include a first photo-detector element having light-receiving areas partitioned along a first direction and a second photo-detector element having light-receiving areas partitioned along a second direction which is a different direction from the first direction. The irradiation light transmitting through the first objective lens unit may further transmit through the first photo-detector element and the second photo-detector element to form a light spot in the first photo-detector element and in the second photo-detector element respectively and may enter the second objective lens unit. The position of the irradiation light converged on the observation object may be detected based on a position of the light spot of the irradiation light formed in the first photo-detector element and a position of the light spot of the irradiation light formed in the second photo-detector element.

Optionally, the first direction and the second direction may be orthogonal to each other.

Optionally, the first photo-detector element may be partitioned in a radial direction, and the second photo-detector element may be partitioned in a circumferential direction.

Optionally, the first photo-detector element may include light-receiving areas partitioned into concentric circles with a central point coinciding the optical axis of the objective lens system, and the second photo-detector element may include sector-formed light-receiving areas, of which circumferences coincide with a circumference of one of the concentric circles in the first photo-detector element having a largest diameter.

Optionally, the photo-detector unit may be disposed orthogonally with respect to the optical axis of the objective lens system.

Optionally, the optical scanner device may, further comprise a controlling system to perform feedback control to arrange the position of the irradiation light converged on the observation object onto a target position based on the detected position of the light spot of the irradiation light transmitting through the photo-detector unit.

Optionally, the photo-detector unit may be formed with photodiode made of semiconductor, which transmits light therethrough and generates electric current from the light.

Optionally, the first objective lens system, the second objective lens system, the first photo-detector element, and the second photo-detector element may be integrally coupled to form a light spot position detector unit.

Optionally, the scanning unit may include a mirror to cast the irradiation light emitted from the light source to scan the observation object and a driving system to drive the mirror in an arbitrary direction.

Optionally, the scanning unit may include an optical fiber to cast the irradiation light emitted from the light source to scan the observation object and a driving system to drive the optical fiber in an arbitrary direction.

According to another aspect of the present invention, there is provided a light spot position detector unit, having an objective lens system, which converges irradiation light emitted from a light source on an observation object, and a photo-detector unit, which is disposed on an optical axis of the objective lens system to have the irradiation light transmit therethrough. A position of the irradiation light converged on the observation object is detected based on a position of a light spot of the irradiation light transmitting through the photo-detector unit.

Optionally, the objective lens system may include a first objective lens unit, which receives the irradiation light from the light source and a second objective lens unit, which receives the irradiation light emitted from the first objective lens unit. The photo-detector unit may be disposed between the first objective lens unit and the second objective lens unit.

Optionally, the photo-detector unit may include a first photo-detector element having light-receiving areas partitioned along a first direction and a second photo-detector element having light-receiving areas partitioned along a second direction which is a different direction from the first direction. The irradiation light transmitting through the first objective lens unit may further transmit through the first photo-detector element and the second photo-detector element to form a light spot in the first photo-detector element and in the second photo-detector element respectively and may enter the second objective lens unit. The position of the irradiation light converged on the observation object may be detected based on a position of the light spot of the irradiation light formed in the first photo-detector element and a position of the light spot of the irradiation light formed in the second photo-detector element.

Optionally, the first direction and the second direction may be orthogonal to each other.

Optionally, the first photo-detector element may be partitioned in a radial direction, and the second photo-detector element is partitioned in a circumferential direction.

Optionally, the first photo-detector element may include light-receiving areas partitioned into concentric circles with a central point coinciding the optical axis of the objective lens system, and the second photo-detector element may include sector-formed light-receiving areas, of which circumferences coincide with a circumference of one of the concentric circles in the first photo-detector element having a largest diameter.

Optionally, the photo-detector unit may be disposed orthogonally with respect to the optical axis of the objective lens system.

Optionally, the photo-detector unit may be formed with photodiode made of semiconductor, which transmits light therethrough and generates electric current from the light.

Optionally, the first objective lens system, the second objective lens system, the first photo-detector element, and the second photo-detector element may be integrally coupled.

According to another aspect of the present invention, there is provided a confocal probe comprising an optical scanner device which includes a scanning unit, which casts irradiation light emitted from a light source in an arbitrary direction to scan an observation object, an objective lens system, which converges the irradiation light on the observation object. and a photo-detector unit, which is disposed on an optical axis of the objective lens system to have the irradiation light transmit therethrough. A position of the irradiation light converged on the observation object is detected based on a position of a light spot of the irradiation light transmitting through the photo-detector unit.

According to another aspect of the present invention, there is provided a confocal probe comprising a light spot position detector unit which includes an objective lens system, which converges irradiation light emitted from a light source on an observation object, and a photo-detector unit, which is disposed on an optical axis of the objective lens system to have the irradiation light transmit therethrough. A position of the irradiation light converged on the observation object is detected based on a position of a light spot of the irradiation light transmitting through the photo-detector unit.

BRIEF DESCRIPTION OF THE ACCOMPANYING DRAWINGS

DETAILED DESCRIPTION OF THE EMBODIMENT

Hereinafter, referring to the accompanying drawings, embodiments of the present invention will be described.

First Embodiment

Figure 1:
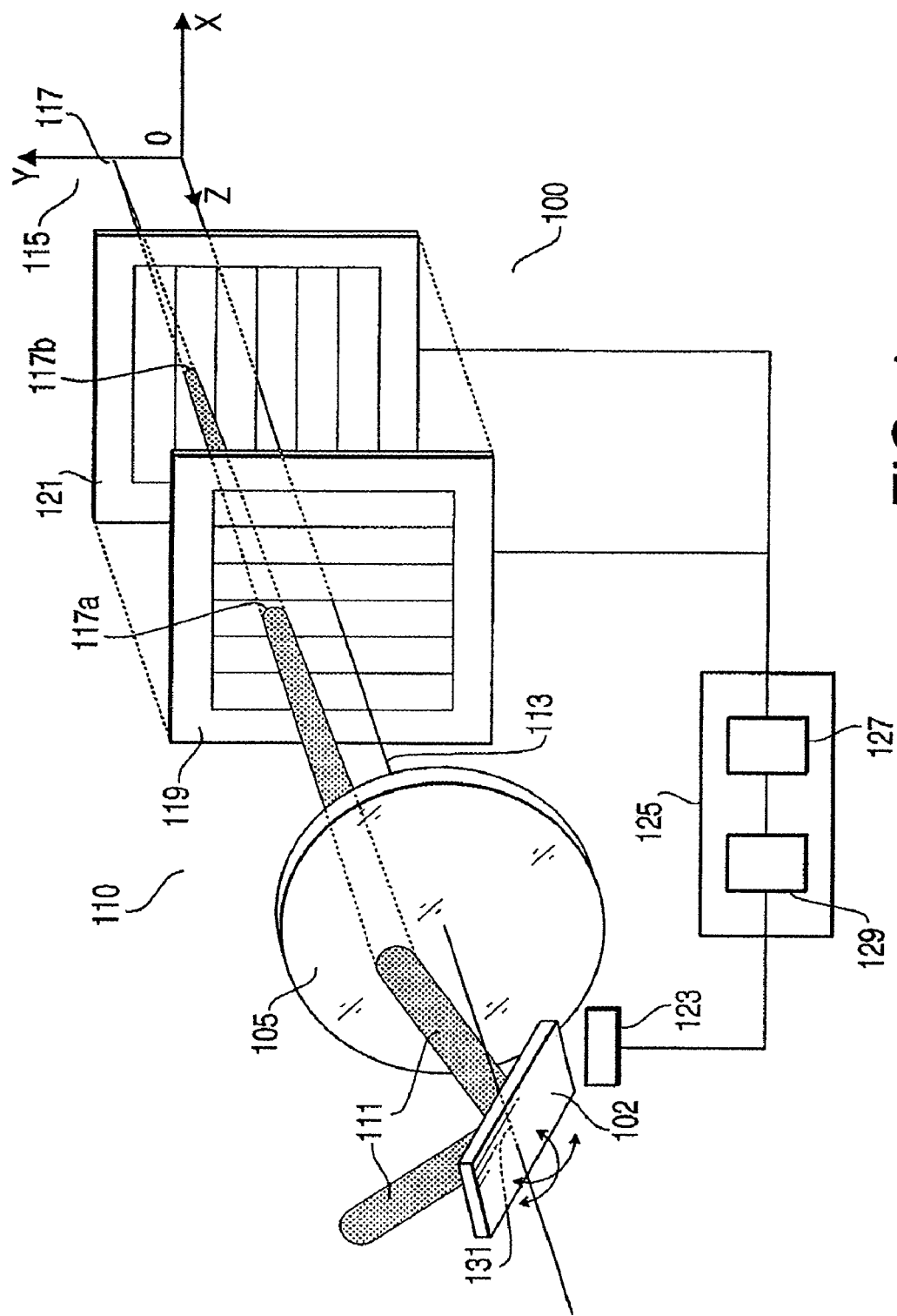
FIG. 1 shows an optical scanner device with photo-detector elements arranged on an optical axis thereof according to a first embodiment of the present invention.

FIG. 1 shows an optical scanner device 100 with photo-detector elements arranged on an optical axis thereof according to a first embodiment of the present invention. The optical scanner device 100 includes an optical system 50 and a control system 60 (see FIG. 2). The optical system 50 includes a light source 150, a mirror unit 102, a light spot position detector unit 110. The control system 60 includes a control unit 125. The light spot position detector unit 110 is provided with an objective lens system 105, a photo-detector element 119, and a photo-detector element 121. It should be noted that an optical axis of the objective lens system 105 is also referred to as an optical axis 113 of the optical scanner device 100.

The mirror unit 102, the objective lens system 105, the photo-detector element 119, and the photo-detector element 121 are respectively arranged on the optical axis 113. In the optical scanner device 100, irradiation light 111 such as laser beam supplied from the light source 150 is a parallel pencil, which enters the mirror unit 102 and is reflected thereby to enter the objective lens system 105. It should be noted that the mirror unit 102 is adapted to be arbitrarily driven to scan the irradiation light 111 by adjusting a reflection angle of the irradiation light 111.

The objective lens system 105 is a lens system configured with a plurality of lenses and optical elements and is adapted to converge the irradiation light 111 as a parallel pencil to have a diameter of its spot to be approximately 1 μm on an observation object 115. With the above configuration, an orthogonal coordinate system as shown in FIG. 1 is defined on the observation object 115. That is, an intersecting point of the optical axis 113 and the observation object 115 is defined to be an original point O, while a direction parallel to the optical axis 113 is defined to be a direction of a Z-axis. Further, an X-axis and a Y-axis are respectively defined to be orthogonal to each other and to the Z-axis as shown in FIG. 1. The irradiation light 111 is converged to form a light spot 117 by power of the objective lens system 105 on a plane being defined by the X-axis and the Y-axis and passing through the original point O. In the present embodiment of the invention, it is configured such that a central point 131 of the mirror unit 102 corresponds to a focal position of the objective lens system 105. That is, the positional relation configures an image side telecentric optical system, and the irradiation light 111 transmitted through the objective lens system 105 travels in parallel with the optical axis 113. Therefore, the irradiation light 111 reflected by the mirror unit 102 can be constantly converged on the plane defined by the X-Y axes and passing through the original point O.

The photo-detector element 119 and the photo-detector element 121 are respectively arranged such that light receiving surfaces thereof are substantially perpendicular to the optical axis 113 and each central point of the light receiving surfaces coincides with the optical axis 113. That is, in the present embodiment of the invention, a position (i.e., an X coordinate, a Y coordinate) of the light spot 117 on the observation object 115 can be detected based on positions of the irradiation light 111 entering the photo-detector element 119 and the photo-detector element 121.

The photo-detector elements will be described further in detail. In the present embodiment, it is assumed that transparent light-receiving elements made of semiconductor as disclosed in, for example, Japanese Patent Provisional Publication No. H11-312821, are used as the photo-detector elements 119, 121. Each of the semiconductor light-receiving elements absorbs a minor part of light received thereon and transmits a major part of the received light to a rear side thereof. Further, the semiconductor light-receiving elements generate electrical current (i.e., photo-electric current) by absorbing the light. The semiconductor light-receiving elements are, for example, photodiodes formed by p-n junction and to be substantially thin to transmit the light therethrough.

The photo-detector element 119 is partitioned into a plurality of pieces, which are evenly aligned orthogonally with respect to the direction of the X-axis (i.e., in parallel with the Y-axis). Each of the pieces is connected with an electrode (not shown). As the irradiation light 111 transmits through the photo-detector electrode 119, it is determined in which electrode the photo-electrode current is generated. Thus, a position of the light spot 117a with respect to the X-axis is detected, and an X coordinate of the light spot 117 on the observation object 115 can be obtained. That is, in the present embodiment, as the irradiation light 111 transmitted through the objective lens system 105 is parallel to the optical axis 113, the X coordinate detected in the photo-detector element 119 based on the position of the light spot 117a is determined to be an X coordinate of the light spot 117.

The photo-detector element 121 is partitioned into a plurality of pieces, which are evenly aligned orthogonally with respect to the direction of the Y-axis (i.e., in parallel with the X-axis). Each of the pieces is connected with an electrode (not shown). As the irradiation light 111 transmits through the photo-detector electrode 121, it is determined in which electrode the photo-electrode current is generated. Thus, a position of the light spot 117b with respect to the Y-axis is detected, and a Y coordinate of the light spot 117 on the observation object 115 can be obtained based on the position of the light spot 117b and a distance between the optical axis 113 and the irradiation light 111. If the irradiation light 111 transmitted through the objective lens system 105 is not parallel with the optical axis 113 and is disposed at a predetermined angle from the optical axis 113, the X coordinate of the light spot 117 can be geometrically detected based on the predetermined angle, the X coordinate of the light spot 117a on the photo-detector element 119, and a distance on the Z-axis between the photo-detector element 119 and the observation object. Similarly, the Y coordinate of the light spot 117 can be detected. However, it should be noted that larger detectable areas on the photo-detector elements 119, 121 are available when the mirror unit 102 and the objective lens system 105 are configured in the image side telecentric optical system so that the irradiation light 111 and the optical axis 113 are maintained parallel to each other. Further, with this configuration, higher resolution for detecting the position can be achieved. It should be noted, if the irradiation light 111 is not parallel with the optical axis 113, available incident ranges of the photo-detector elements 119, 121 are restricted, and the diameters of the light spots 117a, 117b on the respective detector elements 119, 121 become greater, and the X-Y coordinates of the light spot 117 may not be accurately detected.

Thus, according to the present embodiment, with the transparent light-receiving element which transmits irradiation light therethrough, at least one photo-detector element can be arranged on the optical axis 113 of the objective lens system 105. Thus, a simpler configuration for detecting the position of the light spot 117 compared to a conventional detecting method using the beam splitter can be achieved is available, and detecting with higher accuracy is achievable.

Next, control taken by the optical scanner device 100 will be described.

The control unit 125 includes a control circuit 127 and a drive circuit 129. The control circuit 127 is adapted to obtain signals which indicate the X-Y coordinates detected by the photo-detector elements 119, 121 and to control the drive circuit 129. The drive circuit 129 is adapted to drive a driving unit 123 based on control by the control circuit 127. The driving unit 123 electrostatically drives the mirror unit 102 about the central point 131 of the mirror unit 102 in, for example, the aforementioned conventional method using electrostatic force. It should be noted that in the present invention an optical fiber can be used to cast the irradiation light 111 for scanning the observation object 115 in place of the mirror unit 102.

Figure 2:
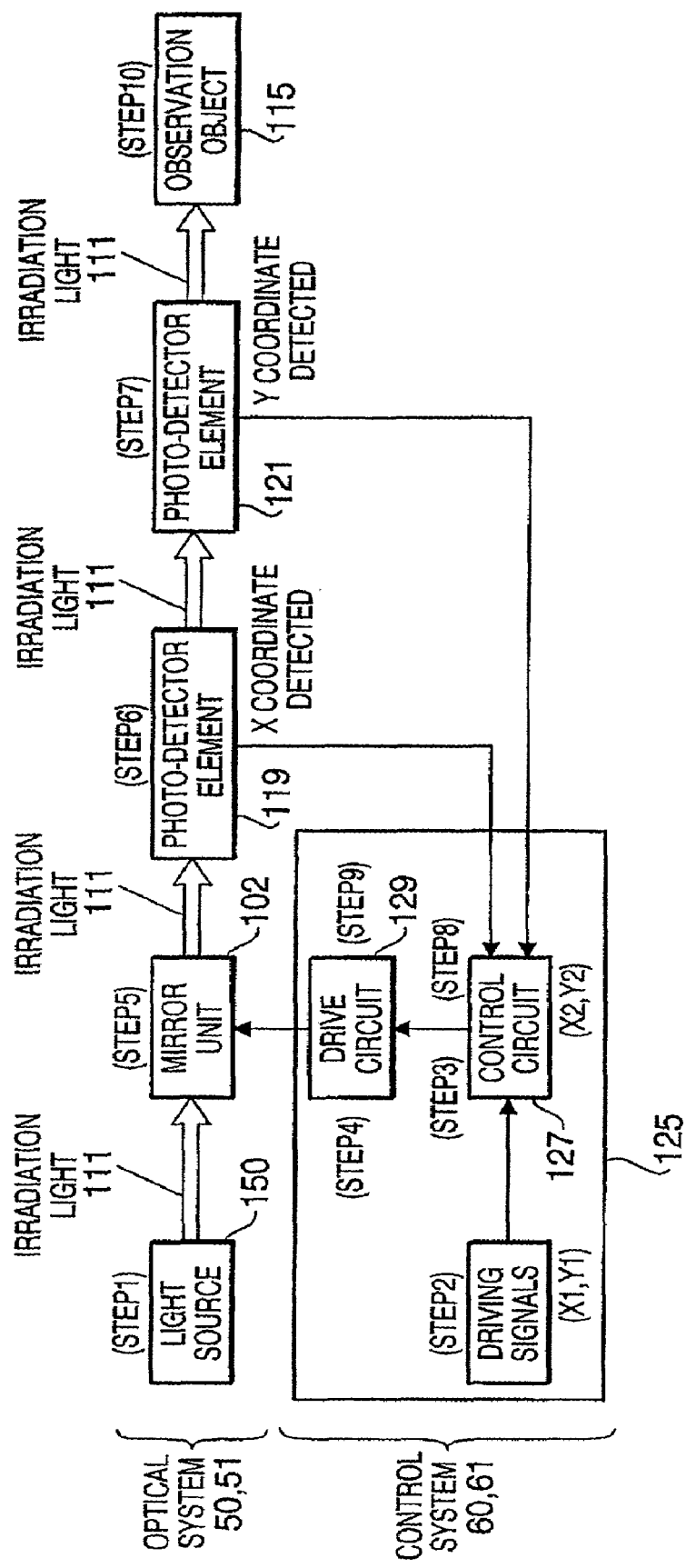
FIG. 2 shows a control flow of the optical scanner device according to the first embodiment of the present invention.

FIG. 2 shows a control flow of the optical scanner device 100 according to the first embodiment of the present invention. First, in the optical system 50, the irradiation light 111 is emitted from the light source 150 to the mirror unit 102 (Step 1). Meanwhile, in the control system 60, the control unit 125 transmits driving signals indicating the coordinates of the light spot 117 (target coordinates (X1, Y1)) to be scanned to the control circuit 127 (Step 2). The control circuit 127 determines an inclination angle of the mirror unit 102 based on the target coordinates based on the driving signals and transmits corresponding controlling signals to the drive circuit 129 (Step 3). The drive circuit 129 inclines the mirror unit 102 according to the controlling signals (Step 4). The inclined mirror unit 102 reflects and emits the irradiation light at a predetermined angle to the objective lens system 105 (Step 5). The irradiation light 111 passed through the objective lens system 105 further transmits through the photo-detector element 119, and thereby the X coordinate of light spot 117a in the photo-detector element 119 is detected (Step 6). Similarly, the Y coordinate of the light spot 117b in the photo-detector element 121 is detected (Step 7). Based on the detected X-Y coordinates, X-Y coordinates (X2, Y2) of the position of the actual light spot 117 on the observation object are determined by the control circuit 127. Further, modified controlling signals wherein the difference between the target coordinates (X1, Y1) and the actually detected coordinates (X2, Y2) is modified so that the coordinates (X2, Y2) correspond to the target coordinates are transmitted to the drive circuit 129 (Step 8). Thereafter, the drive circuit 129 inclines the mirror unit 102 according to the modified controlling signals (Step 9).

The process including Steps 5 through 9 is repeated until the target coordinate (X1, Y1) and the detected coordinates (X2, Y2) coincide. Thus, the control unit 125 of the optical scanner device 100 can accurately control the position of the light spot 117 to coincide the target coordinates by the feedback control based on the detected results obtained by the photo-detector element 119 and the photo-detector element 121.

Figure 3:
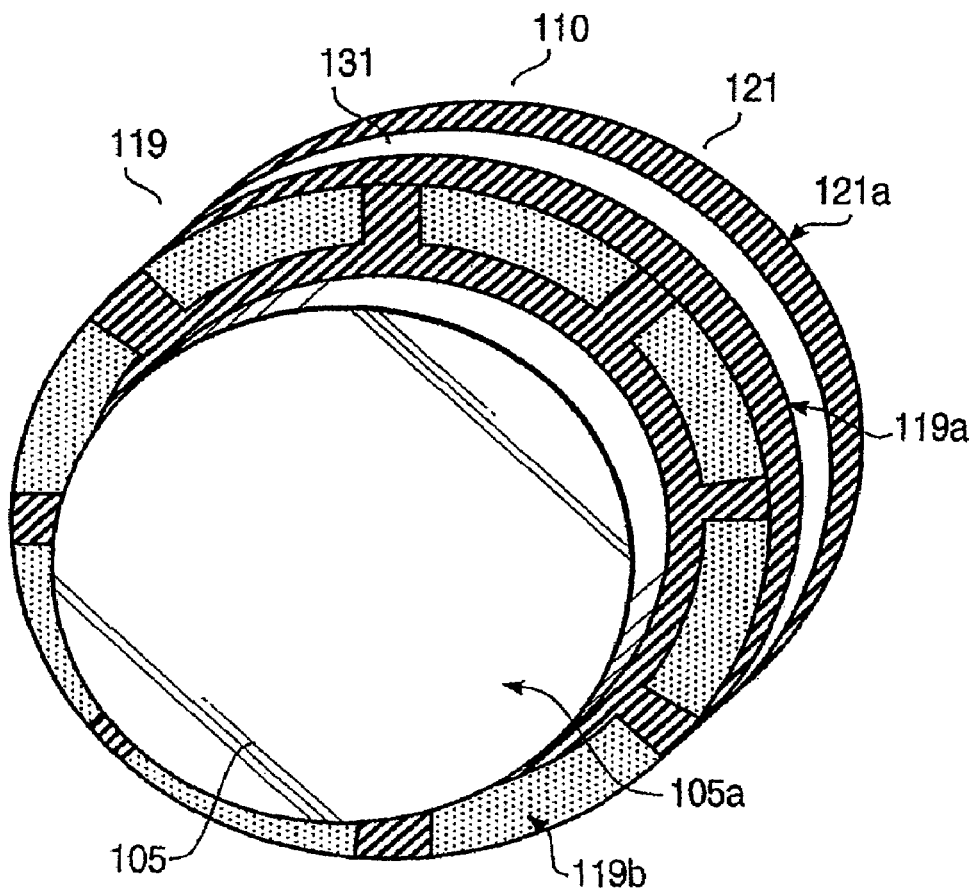
FIG. 3 shows a perspective view of a light spot position detector unit of the optical scanner according to the embodiments of the present invention.
Figure 4:
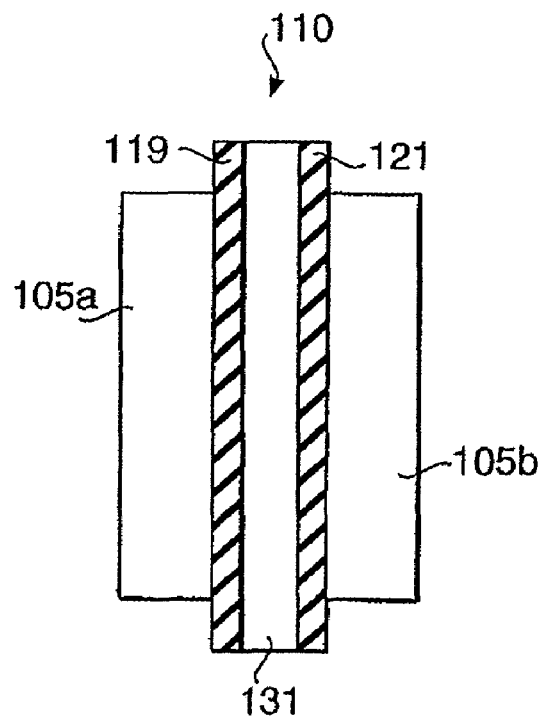
FIG. 4 shows a side view of the light spot position detector unit shown in FIG. 3 according to the embodiments of the present invention.

Next, a configuration of the light spot position detector unit 110 of the optical scanner device 100 according to the first embodiment of the present invention will be described in detail. FIG. 3 shows a perspective view of the light spot position detector unit 110 according to the first embodiment of the invention. FIG. 4 shows a side view of the light spot position detector unit 110 according to the first and the second embodiments of the invention.

The light spot position detecting unit 110 is configured with the objective lens system 105a, the photo-detector element 119, a glass plate 131, the photo-detector element 121, and an objective lens system 105b. The objective lens system 105a is arranged on an incident side of the light spot position detector unit 110, and the objective lens system 105b is arranged on an ejection side of the light spot position detector unit 110. Each of the objective lens systems 105a, 105b is configured with a plurality of lenses, (however, for example, each of the objective lens systems 105a, 105b may be configured with a single lens) and with the objective lens systems 105a, 105b, the irradiation light being a parallel pencil is converged on the observation object 115. More specifically, the objective lens system 105a is configured to be as an image side telecentric optical system, while the objective lens system 105b is configured to be a system to converge the irradiation light which is a parallel pencil.

The photo-detector element 119 includes partitioned laminate portions 119a, each of which is made of a transparent semiconductor element, and electrodes 119b, each of which is connected with one of the laminate portions 119a. The photo-detector element 121 is configured similarly to the photo-detector element 119, however, a direction along which the laminated portions 121a are partitioned is different from that of the laminated portions 119a. The objective lens system 105a is coupled to one side of the photo-detector element 119, and the other side of the photo-detector element is coupled to one side of the glass plate 131. The other side of the glass plate 31 is further coupled to one side of the photo-detector element 121, and the other side of the photo-detector element 121 is coupled to one side of the objective lens system 105b. Thus, the irradiation light 111 emitted via the mirror unit 102 is transmitted through the objective lens system 105a, the photo-detector element 119, the glass plate 131, the photo-detector element 121, and the objective lens system 105b respectively. In the present embodiment, the irradiation light 111 entering the light spot position detector unit 110 is a parallel pencil having a diameter of approximately 200 μm, and a diameter of the light spot on the observation object 115 is approximately 1 μm. Diameters of the objective lens systems 105a, 105b are approximately 1.0-1.5 mm, and a linear range to be scanned by the mirror unit 102 is approximately from 250 μm to 400 μm.

It should be noted that as the light spot position detector unit 110 is assembled integrally with the optical components of the objective lens systems 105a, 105b and the photo-detector elements 119, 121 being coupled to one another via the glass plate 131, the light spot position detector unit 110 can be configured to be smaller. Further, as the light spot position detector unit 110 is integrally assembled, procedures for correctly aligning the optical components and the photo-detector elements with respect to the optical axis can be omitted, therefore, the light spot position detector unit 110 can be easily assembled and the positions of the components can be easily adjusted. Further, with the photo-detector elements 119, 121, the spot positions of the irradiation light 111 are directly detected, the positions can be detected with higher accuracy compared to the conventional detecting method depending on the inclination angle of the mirror unit as a scanning means.

As above, the optical scanner device 100 to obtain the position of the light spot 117 in the X-axis direction and the Y-axis direction based on the orthogonal coordinate system has been described.

Second Embodiment

Next, an optical scanner device 200 to obtain a position of a light spot based on a polar coordinate system (r, θ) according to a second embodiment of the present invention will be described.

Figure 5:
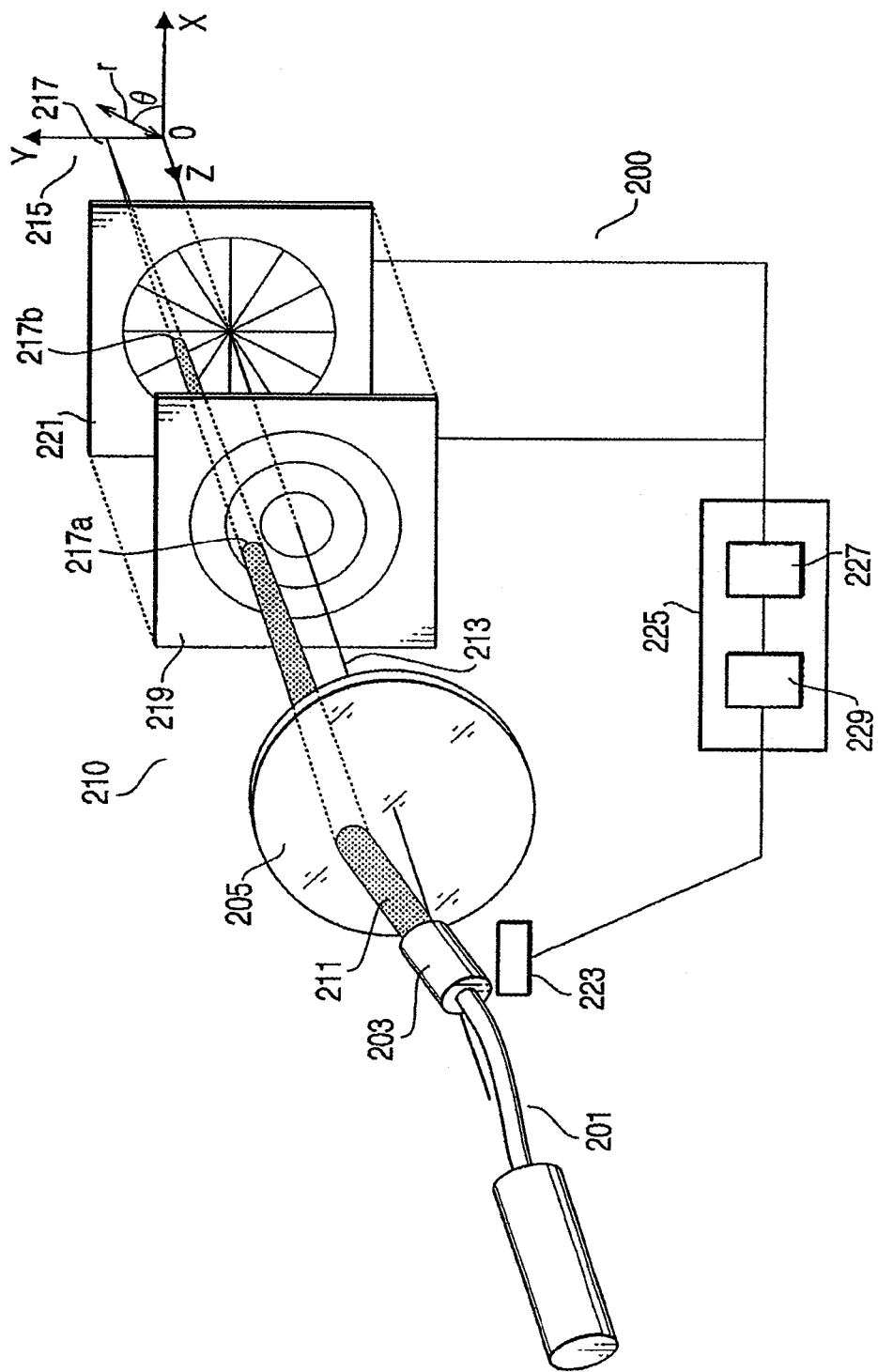
FIG. 5 shows an optical scanner device with photo-detector elements arranged on an optical axis thereof according to a second embodiment of the present invention.
Figure 6:
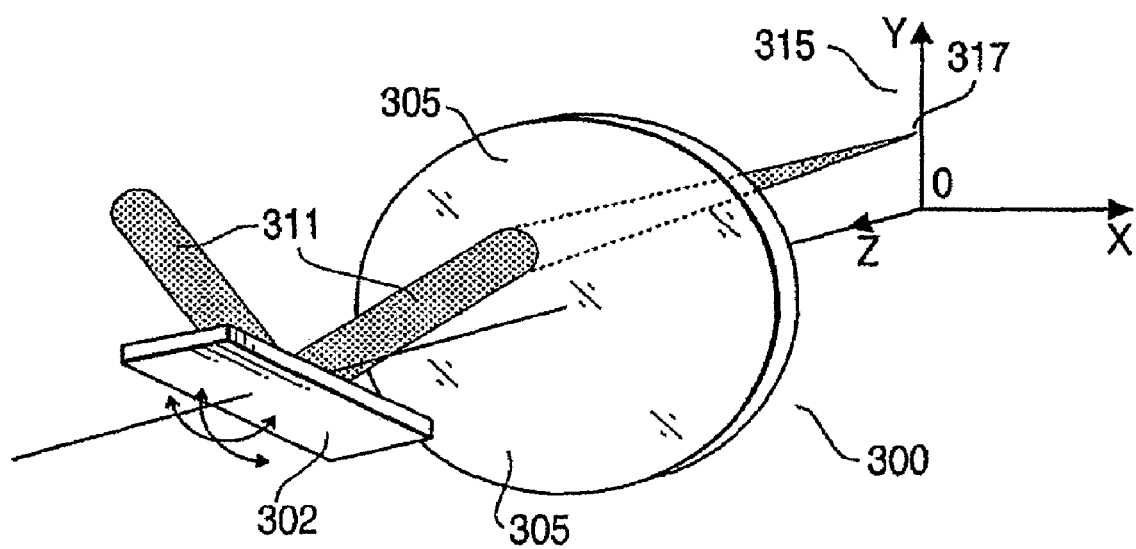
FIG. 6 shows a conventional optical scanner device with a photo-detector element having an electrostatically actuated mirror unit as a means to scan irradiation light.
Figure 7:
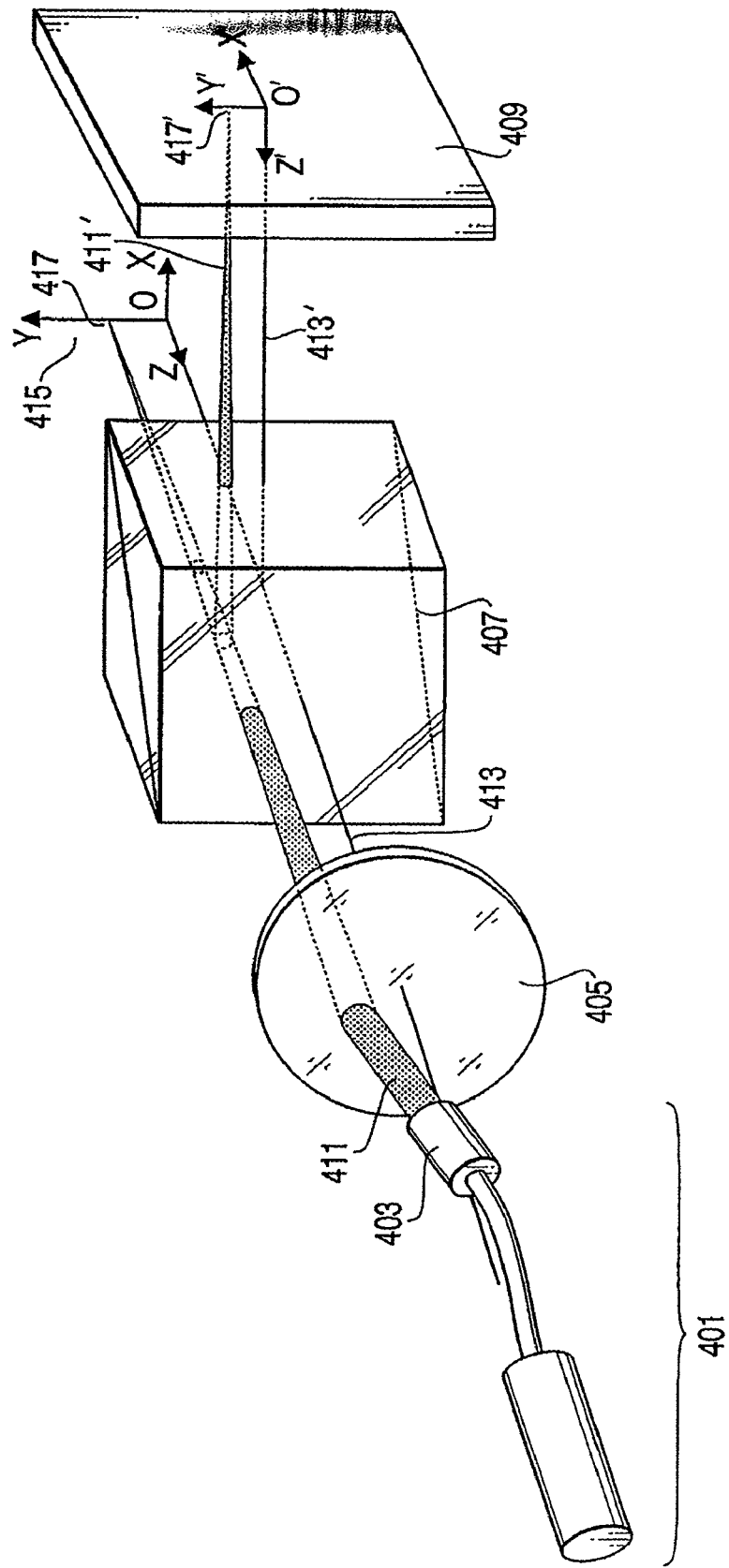
FIG. 7 shows a conventional optical scanner device to measure a position of a light spot independently from an inclination angle of a mirror unit.

FIG. 5 shows an optical scanner device 200 with photo-detector elements arranged on an optical axis thereof according to a second embodiment of the present invention. In the present embodiment, description of a configuration being similar to the configuration described in the first embodiment will be omitted. The optical scanner device 200 includes an optical system 51 (see FIG. 2) having an optical fiber unit 201, a light spot position detector unit 210, and a control system 61 (see FIG. 2) having a control unit 225. The light spot position detector unit 210 includes an objective lens system 205, a photo-detector element 219, and a photo-detector element 221. It should be noted that an optical axis of the objective lens system 205 is referred to as an optical axis 213 of the optical scanner device 200. The optical fiber unit 201 includes a scanning unit 203, which is adapted to be arbitrarily driven to scan irradiation light 211 (for example, laser beam) emitted from a light source 150 (see FIG. 2) on the observation object 217.

Each of the scanning unit 203, the objective lens unit 205, the photo-detector element 219, and the photo-detector element 221 is arranged on the optical axis 213. In the optical scanner device 200, the irradiation light 211 supplied from the light source 150 is a parallel pencil, which is emitted from the scanning unit 203 of the optical fiber unit 201 and enters the objective lens unit 205. The scanning unit 203 is capable of adjusting an ejection angle of the irradiation light 211 to cast, and it should be noted that the scanning unit 203 serves substantially equivalently to the mirror unit 102 in a way to cast the irradiation light 211 on the observation object 215 in arbitrary directions. The objective lens system 205 functions substantially equivalently to the objective lens system 105 of the optical scanner device 100, and description of that will be omitted.

The optical axis 213, an XYZ coordinate system, and an original point O of the XYZ coordinate system are defined similarly to the first embodiment. Further, for polar coordinates, a length r of a line perpendicular from a target coordinates (X1, Y1) to the optical axis 213 and an angle θ between the perpendicular line and an X-Y plane defined by the X axis and the Y axis are defined.

The photo-detector element 219 is partitioned into a plurality of ring-shaped areas, which are for example evenly divided in radial directions, with their central points coinciding the optical axis 213. Each of the partitioned ring-shaped areas is connected with an electrode (not shown). The electrodes may be, for example, substantially thin or transparent electrodes generally used in LCDs (liquid crystal display). As the irradiation light 211 transmits through the photo-detector element 219, it is determined in which electrode photo-electrode current is generated. Thus, an r coordinate of the light spot 217a in the photo-detector element 219 can be detected.

The photo-detector element 221 is partitioned into a plurality of sector-formed areas, which are for example evenly divided in their circumferential direction. A circumference including the sector-formed areas coincides a circumference of one of the ring-shaped areas having a largest diameter. Each of the sector-formed areas is connected with an electrode (not shown). As the irradiation light 211 transmits through the photo-detector element 221, it is determined in which electrode photo-electrode current is generated. Thus, a θ coordinate of the light spot 217b can be detected.

The control unit 225 includes a control circuit 227 and a drive circuit 229. The scanning unit 203 of the optical fiber unit 201 is arbitrarily driven by a driving unit 223.

In the optical scanner device 200 having the photo-detector element 219 and the photo-detector element 221, each of which is partitioned along an axial direction of the polar coordinate system (r, θ), control similar to the control taken in the optical scanner device 100 in the first embodiment is performed. However, as the coordinates detected in Step 6 and Step 7 in the second embodiment are in the polar coordinate system, Step 8 is different in that the detected polar coordinates are respectively converted to X-Y coordinates, and the corresponding position is considered to be the position of the light spot 217. Thereafter, modified controlling signals are transmitted to the drive circuit 229.

As above, by arranging the photo-detector elements configured with semiconductor light-receiving elements which transmit light therethrough, a position of the light spot can be detected without having the irradiation light split from the optical axis. Thus, a position of the light spot can be accurately controlled.

A configuration of a light spot position detector unit 210 of the optical scanner device 200 in the second embodiment is similar to that of the light spot position detector unit 110 of the optical scanner device 100 in the first embodiment. Therefore, detailed description of that will be omitted.

Although examples of carrying out the invention have been described above, the present invention is not limited to the above described embodiments. For example, in the light spot position detector units 110, 210 shown in FIGS. 3 and 4, the objective lens systems 105a, 105b are employed, however, the number of the objective lens system may be one, i.e., solely either one of the objective lens system 105a, 105b may be employed (in this case, even with one objective lens system, the light spot detector unit can function substantially as shown in the optical scanner devices shown in FIGS. 1 and 5). For another example, there may be provided solely one photo-detector element, which is partitioned in grid to detect a position of the light spot that transmits therethrough. Further, the one photo-detector element may be partitioned into rings and sectors.

The present disclosure relates to the subject matter contained in PCT application No. PCT/JP2005/019667, filed on Oct. 26, 2005, which relates to the subject matter contained in Japanese Patent Application No. 2004-316106, filed on Oct. 29, 2004, which are expressly incorporated herein by reference in its entirety.

What is claimed is:

1. An optical scanner device, comprising:
    a scanning unit, which casts irradiation light emitted from a light source in an arbitrary direction to scan an observation object;
    an objective lens system, which converges the irradiation light on the observation object; and
    a photo-detector unit, which is disposed on an optical axis of the objective lens system to have the irradiation light transmit therethrough,
    wherein a position of the irradiation light converged on the observation object is detected based on a position of a light spot of the irradiation light transmitting through the photo-detector unit, and
    wherein the objective lens system is configured to be an image side telecentric optical system.

* * * * *